(12) United States Patent
Trinkenschuh et al.

(10) Patent No.: US 11,884,158 B2
(45) Date of Patent: Jan. 30, 2024

(54) DRIVE UNIT FOR A DRIVE TRAIN OF AN ELECTRICALLY DRIVABLE MOTOR VEHICLE AND DRIVE ARRANGEMENT HAVING SAID DRIVE UNIT

(71) Applicant: Schaeffler Technologies AG & Co. KG, Herzogenaurach (DE)

(72) Inventors: Andreas Trinkenschuh, Buhl (DE); Steffen Lehmann, Ettlingen (DE); Carsten Mayer, Lohr a. Main (DE); Marco Grethel, Buhletal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 588 days.

(21) Appl. No.: 15/734,795

(22) PCT Filed: Jun. 4, 2019

(86) PCT No.: PCT/DE2019/100493
§ 371 (c)(1),
(2) Date: Dec. 3, 2020

(87) PCT Pub. No.: WO2019/242803
PCT Pub. Date: Dec. 26, 2019

(65) Prior Publication Data
US 2021/0229543 A1    Jul. 29, 2021

(30) Foreign Application Priority Data

Jun. 20, 2018   (DE) .......................... 102018114789.9

(51) Int. Cl.
*B60K 6/26* (2007.10)
*B60K 6/387* (2007.10)
(Continued)

(52) U.S. Cl.
CPC ................ *B60K 6/387* (2013.01); *B60K 6/24* (2013.01); *B60K 6/26* (2013.01); *F16D 25/12* (2013.01);
(Continued)

(58) Field of Classification Search
CPC ............. F16H 57/0415; F16H 57/0424; F16H 57/0473; F16H 57/0476; B60K 6/24;
(Continued)

(56) References Cited

U.S. PATENT DOCUMENTS 5,845,731 A * 12/1998 Buglione ................ B60L 50/30
                                                         180/65.23
6,082,514 A *  7/2000 Averill .................... F16D 11/10
                                                         192/84.92
(Continued)

FOREIGN PATENT DOCUMENTS

CN       103975180       8/2014
CN       105102250      11/2015
(Continued)

*Primary Examiner* — William C Joyce
(74) *Attorney, Agent, or Firm* — Volpe Koenig

(57) ABSTRACT

A drive unit and a drive arrangement having the drive unit are provided. The drive unit includes a first electric machine and a second electric machine and an output shaft. A rotor of the second electric machine is connected to the output shaft for conjoint rotation and the drive unit has a separating clutch by which a rotor of the first electric machine is connected to the output shaft for torque transmission. The drive unit furthermore has a first flow system for implementing a flow of a first liquid for at least partial cooling of at least one electric machine and a second flow system for implementing a flow of a second liquid, the first flow system and the second flow system being arranged such that heat from the first liquid in the first flow system is transferred to the second liquid in the second flow system.

17 Claims, 4 Drawing Sheets

(51) Int. Cl.
  *B60K 6/24* (2007.10)
  *F16D 25/12* (2006.01)
  *F16D 28/00* (2006.01)
  *F16H 57/04* (2010.01)
  *H02K 7/00* (2006.01)
  *H02K 7/108* (2006.01)
  *H02K 9/19* (2006.01)
  *B60K 6/442* (2007.10)

(52) U.S. Cl.
  CPC ......... *F16D 28/00* (2013.01); *F16H 57/0415* (2013.01); *F16H 57/0424* (2013.01); *F16H 57/0473* (2013.01); *F16H 57/0476* (2013.01); *H02K 7/006* (2013.01); *H02K 7/108* (2013.01); *H02K 9/19* (2013.01); *B60K 6/442* (2013.01); *B60Y 2200/92* (2013.01); *B60Y 2306/03* (2013.01); *B60Y 2306/05* (2013.01); *B60Y 2400/405* (2013.01); *B60Y 2400/406* (2013.01); *B60Y 2400/60* (2013.01)

(58) Field of Classification Search
  CPC ......... B60K 6/26; B60K 6/387; B60K 6/442; H02K 7/006; H02K 7/108; H02K 9/19
  See application file for complete search history.

(56) References Cited

U.S. PATENT DOCUMENTS

| | | | |
|---|---|---|---|
| 6,862,887 B2 | 3/2005 | Noreikat et al. | |
| 10,272,767 B1* | 4/2019 | Tang | F01P 5/10 |
| 10,525,968 B2 | 1/2020 | Felsch et al. | |
| 2003/0106729 A1 | 6/2003 | Noreikat et al. | |
| 2019/0120369 A1 | 4/2019 | Staake et al. | |

FOREIGN PATENT DOCUMENTS

| | | | |
|---|---|---|---|
| DE | 10154147 | | 7/2003 |
| DE | 2017084887 | | 5/2017 |
| DE | 102015222690 | | 5/2017 |
| DE | 102015222691 | | 5/2017 |
| DE | 102015222692 | | 5/2017 |
| DE | 102015222694 | | 5/2017 |
| JP | 2011-225134 | * | 11/2011 |
| JP | 2013006433 | | 1/2013 |
| JP | 2013121788 | | 6/2013 |
| JP | 2016193681 | | 11/2016 |
| JP | 2017052335 | | 3/2017 |
| JP | 2018057243 | | 4/2018 |
| WO | 2017084888 | | 5/2017 |
| WO | 2017084889 | | 5/2017 |

* cited by examiner

DRIVE UNIT FOR A DRIVE TRAIN OF AN ELECTRICALLY DRIVABLE MOTOR VEHICLE AND DRIVE ARRANGEMENT HAVING SAID DRIVE UNIT

CROSS-REFERENCE TO RELATED APPLICATIONS

This application is the U.S. National Phase of PCT Appln. No. PCT/DE2019/100493, filed Jun. 4, 2019, which claims priority to DE 102018114789.9, filed Jun. 20, 2018, the entire disclosures of which are incorporated by reference herein.

TECHNICAL FIELD

A drive unit for a drive train of an electrically drivable motor vehicle and a drive arrangement which comprises the drive unit.

BACKGROUND

Drive devices for a hybrid vehicle are known from the prior art, which include, inter alia, an internal combustion engine, a first electric machine and a second electric machine.

DE 10 2015 222 690 A1, DE 10 2015 222 691 A1 and WO 2017 084 887 A1 describe methods for controlling such a drive device, wherein the drive device can be operated in several operating modes.

In DE 10 2015 222 690 A1, a serial hybrid operation is mainly explained, in which the traction drive torque is brought about by means of the second electric machine and the internal combustion engine drives the first electric machine to generate electrical energy. It is described how the internal combustion engine is operated at an operating point, wherein a combined efficiency of the drive device depends on the efficiency of the internal combustion engine and on the efficiency of the first electric machine.

The documents DE 10 2015 222 691 A1 and WO 2017 084 887 A1 describe a performance-oriented and a consumption-oriented mode, wherein each mode is dependent on a condition. This condition involves increasing a target drive value to an intermediate value, which between an internal combustion engine threshold represents a maximum drive value in a parallel hybrid operation, in which only the internal combustion engine provides traction drive torque and a parallel hybrid mode threshold, which represent a maximum drive value in the parallel boost hybrid mode.

DE 10 2015 222 692 A1, WO 2017 084 888 A1, DE 10 2015 222 694 A1 and WO 2017 084 889 A1 describe a method for operating a drive device of a hybrid vehicle for driving a drive wheel, wherein the drive device comprises an internal combustion engine, a first electric machine coupled to the internal combustion engine, a second electric machine, an electric accumulator and a main clutch between the internal combustion engine and the drive wheel.

DE 10 2015 222 692 A1 and WO 2017 084 888 A1 describe that the drive device is operated in one of three operating modes, namely in a purely electrical operation, a serial hybrid operation or a parallel hybrid operation, wherein the traction drive torque provided during the change from the first operating mode to the second operating mode corresponds to a suitably selectable curve between the traction drive torque provided before and after the change.

DE 10 2015 222 694 A1 and WO 2017 084 889 A1 disclose that a transmission is also arranged between the internal combustion engine and the drive wheel. Furthermore, a respective cited document describes a hybrid vehicle which has a hybrid drive device.

The hybrid vehicle described repeatedly in the prior art comprises an internal combustion engine, a first and a second electric machine, at least one drive wheel, a main clutch, and a first and a second clutch. The main clutch is arranged between the internal combustion engine and a drive wheel, the first clutch is provided between the first electric machine and an output shaft of the internal combustion engine, and the second clutch is provided between the second electric machine and a drive wheel. From DE 10 2017 128 289.0 (not yet published), a drive unit for a drive train of a hybrid vehicle is known, with an internal combustion engine, a first electric machine, a second electric machine, a first transmission stage, and a drive shaft of the first electric machine and/or the second electric machine. Furthermore, the drive unit comprises a transmission sub-unit, via which the drive shaft of the respective electric machine is coupled or can be coupled to wheel drive shafts. A second transmission stage is coupled to a countershaft unit, wherein the countershaft unit has an integrated clutch and is further connected to the wheel drive shafts such that the internal combustion engine can be coupled to the wheel drive shafts via the second transmission stage depending on the position of this clutch.

DE 10 2017 127 695.5 (also not yet published) discloses a drivetrain for a hybrid vehicle which has a transmission input shaft which is in an operative relationship via a first partial drive train with a first electric machine and an internal combustion engine for torque transmission and which is in an operative relationship via a second partial drive train with a second electric machine for torque transmission. The second electric machine is permanently connected to the transmission input shaft so as to transmit torque, and the first electric machine and the internal combustion engine can be connected to the transmission input shaft in a coupleable manner for torque transmission. The first electric machine and/or the second electric machine can be designed to be cooled. It is particularly preferred if the cooling is implemented by means of water cooling from a vehicle cooling circuit or by means of oil cooling with transmission oil from the transmission. Furthermore, the separating clutch used can also be designed as an oil-cooled multi-plate clutch.

SUMMARY

The object is to provide a drive unit for a drive train of an electrically drivable motor vehicle and a drive arrangement equipped with same, of which individual components, in particular electric machines, can be optimally cooled and thus operated with reduced wear.

This object is achieved by the drive unit having one or more features described herein and by the drive arrangement having one or more features described herein. Advantageous embodiments of the drive unit are described below and in the claims Advantageous embodiments of the drive arrangement are also described below and in the claims.

The features of the claims may be combined in any technically useful way, including the explanations given in the following description and features of the figures which comprise additional embodiments.

A drive unit for a drive train of an electrically drivable motor vehicle, in particular a hybrid vehicle, is provided with a first electric machine and a second electric machine and an output shaft, which is also referred to as a transmission input shaft. A rotor of the second electric machine is connected to the output shaft for conjoint rotation. Furthermore, the drive unit comprises a separating clutch with which a rotor of the first electric machine and thus an internal combustion engine connected to a first shaft connected to the rotor of the first electric machine for conjoint rotation can be or is connected to the output shaft for torque transmission. The drive unit also has a first flow system for implementing a flow of a first liquid for at least partial cooling of at least one electric machine and a second flow system for implementing a flow of a second liquid, the first flow system and the second flow system being arranged and designed such that heat from the first liquid in the first flow system can be transferred to the second liquid in the second flow system.

The first liquid is preferably also used to lubricate movably arranged components, in particular the electric machine or also a gearwheel transmission. The first flow system is also equipped in a corresponding manner in order to supply the first liquid to the components to be lubricated or cooled. In this case, the flow of the first liquid is preferably implemented through the drive unit through the first flow system. It is provided in particular that the two electric machines are arranged in series. In a preferred embodiment, it is provided that the rotors of the two electric machines or their axes of rotation are arranged coaxially. The separating clutch is a switchable clutch that can be switched from an open state to a closed state and vice versa. The separating clutch is located in the torque transmission path between the two electric machines.

The drive unit can be designed such that the first shaft firmly connected to the rotor of the first electric machine is arranged radially inside the output shaft firmly connected to the rotor of the second electric machine.

The first shaft can be designed to be divided, namely in the form of a central hollow shaft on which a hub which is connected for conjoint rotation is arranged in some areas, which is also connected to the rotor of the first electric machine for conjoint rotation.

The radial inner side of the separating clutch can thus be connected to the hub on the first electric machine for conjoint rotation, and the radial outer side of the separating clutch can be connected to the output shaft, which is connected to the rotor of the second electric machine for conjoint rotation.

Furthermore, the drive unit can have a transmission which is in operative connection with the output shaft of the drive unit, also referred to as the transmission input shaft, so that a torque provided by the output shaft or the rotary movement realized by the output shaft can be directed stepped up or stepped down via the transmission to a further transmission unit of a motor vehicle, or can also be directed directly to drive wheels of a motor vehicle. This transmission can comprise a differential transmission or be designed as such. The transmission can include a first gearwheel, which meshes with external toothing on the output shaft. The first gearwheel thus realizes a transmission stage in the drive unit. This first gearwheel can be coupled to a countershaft of the transmission for conjoint rotation, the external toothing of which in turn meshes with an input gearwheel of a differential transmission, thereby realizing a third transmission stage.

In particular, it is provided that the drive unit has a heat exchanger for transferring heat from the first liquid to the second liquid. In a corresponding manner, the first flow system and the second flow system are connected to a heat exchanger or a heat exchanging device, in which the heat is transferred from the first liquid to the second liquid. The heat exchanger or heat exchanging device is flowed through by the liquids of the two flow systems, so that heat can be transferred from the first liquid to the second liquid.

The first flow system can further be designed in such a way that the first liquid can also be fed to the separating clutch for the purpose of cooling and/or lubrication. This embodiment also makes it possible for the first liquid transported by the first flow system to be fed to the separating clutch only for the purpose of its cooling or lubrication. A corresponding hydraulically actuatable actuator for actuating the separating clutch can be dispensed with in this embodiment.

The first flow system can also supply the first liquid to bearings, friction elements or transmission stages of sub-transmissions for the purpose of cooling or lubrication.

In particular, it is provided that a respective flow system is implemented as a flow circuit, wherein oil is preferably used as the first liquid and water is used as the second liquid.

The second flow circuit can thus be a water circuit integrated in the housing of the electric machine to be cooled, for cooling the oil in the first flow circuit by means of a heat exchanging device.

Alternatively or additionally, the first flow system and the separating clutch can be arranged and configured in such a way that the first fluid can be fed to the separating clutch from the first flow system for the purpose of its hydraulic actuation. However, this alternative embodiment does not rule out that the separating clutch is also cooled by liquid in the first flow system.

Furthermore, the drive unit can have a volumetric flow source, in particular a pump, a hydraulic clutch actuator as an actuation system for actuating the separating clutch and a switching device with which the liquid volumetric flow provided by the volumetric flow source can be fed sequentially to the electric machine or the clutch actuator. A sequential actuation of the separating clutch and the cooling or lubrication of the electric machine can thus take place. This switching device can in particular be a 3/2-way valve. The drive unit can have a hydraulic control unit for controlling the volumetric flow source configured as a hydraulic pump and/or the switching device as required.

A pressurized line is then used to supply the separating clutch with the liquid volumetric flow.

In an alternative embodiment, it is provided that the separating clutch is designed to be electromechanically actuatable. A corresponding electromechanical actuator is provided for this purpose. The generated liquid volumetric flow can then be used exclusively for cooling.

In a further preferred embodiment of the drive unit, it is provided that the first flow system respectively of at least one electric machine has a branch into a first cooling path and into a second cooling path, so that the electric machine can be cooled in a radial interior formed by its rotor and also on its radial outer side. Furthermore, the drive unit can have an oil filter, which is preferably arranged in the transmission sump.

The hydraulic components of the drive unit can form a hydraulic unit which is preferably mechanically connected directly to the housing of the electric machine to be cooled or is integrated therein.

In particular, the heat exchanger can be part of the housing of the electric machine or be directly mechanically connected to the housing.

Another aspect provided herein is a drive arrangement with a drive unit as described herein and with an internal combustion engine, which in particular is indirectly coupled or can be coupled to the rotor of the first electric machine for conjoint rotation. The internal combustion engine is connected via the first shaft or connected to the first shaft via a further coupling device, if necessary with the interposition of a vibration damper.

Furthermore, the drive arrangement can comprise a transmission or an input element of a wheel drive, wherein the internal combustion engine is or can be mechanically connected via the drive unit to the transmission or the input element of the wheel drive via the separating clutch of the drive unit. In a favorable embodiment, the drive arrangement comprises at least one wheel drive shaft, which is connected to the output shaft of the drive unit via the transmission, so that a rotary movement realized by the output shaft can be transmitted through the transmission to the wheel drive shaft.

In addition, between the internal combustion engine and a first shaft, which is connected to the rotor of the first electric machine for conjoint rotation, the drive arrangement can have a first transmission stage for the purpose of converting the speed of the rotary movement realized by the internal combustion engine on the first shaft.

The output element of the internal combustion engine can be a damper unit, or a clutch for opening and closing the torque transmission path between the internal combustion engine and the drive unit, or a combination of a damper unit and a clutch. Furthermore, the output element can have an internally toothed gearwheel as a component, which meshes with an external toothing of the first shaft and thus realizes the first transmission stage.

BRIEF DESCRIPTION OF THE DRAWINGS

The embodiments described above is explained in detail below based on the relevant technical background with reference to the associated drawings, which show preferred embodiments. The invention is in no way restricted by the purely schematic drawings, although it should be noted that the embodiments shown in the drawings are not limited to the dimensions shown. In the figures.

DETAILED DESCRIPTION

Figure 1:
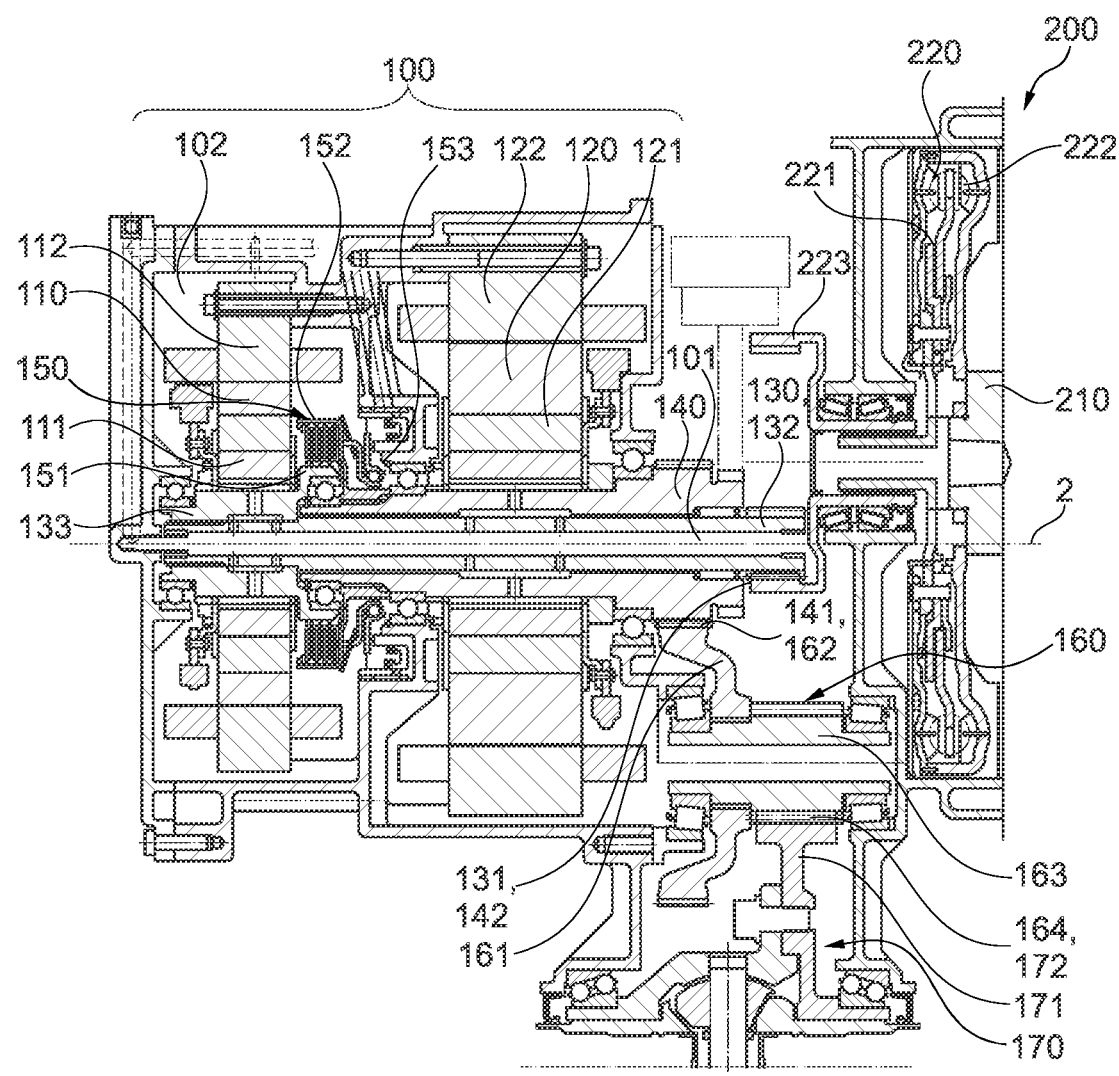
FIG. 1: shows a drive arrangement according to an embodiment in a sectional view.

FIG. 1 shows a drive unit 100 for a drive train of an electrically drivable motor vehicle, in particular a hybrid vehicle, which has a first electric machine 110 and a second electric machine 120, both of which are arranged on a common axis of rotation 101. The rotor 111 of the first electric machine 110 is arranged coaxially to the axis of rotation 101 and also to the rotor 121 of the second electric machine 120. The stator 112 of the first electric machine 110 and also the stator 122 of the second electric machine 120 are accommodated in a housing 102 of the drive unit 100.

The rotor 111 of the first electric machine is connected to a first shaft 130 for conjoint rotation. The rotor 121 of the second electric machine 120 is connected to an output shaft 140 for conjoint rotation, which can also be referred to as a transmission input shaft.

Furthermore, the drive unit 100 comprises a separating clutch 150 with which the first electric machine 110 and thus an internal combustion engine connected to the first shaft 130 connected for conjoint rotation to the rotor 111 of the first electric machine 110 can be or is connected to the output shaft for torque transmission.

In the embodiment shown here, the first shaft 130 is designed in two parts, namely made up of a central hollow shaft 132 and a hub 133 positioned on this hollow shaft 132 and connected thereto for conjoint rotation, wherein the hub 133 is also connected to the rotor 111 of the first electric machine 110 in a fixed manner.

The hub 133 forms the radial inner side 151 of the separating clutch 150 or is firmly connected to this input side of the separating clutch 150.

The radial outer side 152 of the separating clutch 150, which realizes the output side of the separating clutch 150, is connected to the output shaft 140 for conjoint rotation.

The separating clutch 150 is a switchable clutch that can be switched from an open state to a closed state and vice versa. For this purpose, the separating clutch 150 is assigned an actuation system 153.

In this way, when the separating clutch 150 is closed, a torque can be transmitted from the first shaft 130 to the output shaft 140 or vice versa.

In the embodiment shown here, it is thus provided that the two electric machines 110, 120 are arranged in series, wherein the rotors 111, 121 of the two electric machines 110, 120 or their axes of rotation are arranged coaxially.

The first shaft 130 or its central hollow shaft 132 runs radially inside the output shaft 140, whereby the overall volume required for the drive unit 100 can be kept small.

Furthermore, the drive unit 100 shown here comprises a transmission 160 which is in operative connection with the output shaft 140 of the drive unit 100, also referred to as the transmission input shaft, so that a torque made available by the output shaft 140 or the rotary movement realized by the output shaft 140 can be directed stepped up or stepped down via the transmission 160 to a further transmission unit of a motor vehicle, or can also be directed directly to drive wheels of a motor vehicle.

In the embodiment shown here, this transmission 160 comprises a differential transmission 170.

Furthermore, the transmission 160 comprises a first gearwheel 161, which meshes with an external toothing 141 on the output shaft 140. A second transmission stage 162 is thus realized in the drive unit 100 by the first gearwheel 161. This first gearwheel 161 is coupled to a countershaft 163 of the gear 160 for conjoint rotation, the external toothing 164 of which in turn meshes with an input gear 171 of the differential gear 170, thereby realizing a third transmission stage 172.

The drive unit 100 is part of a likewise illustrated embodiment of a drive arrangement 200 according to an embodiment.

This drive arrangement 200 additionally has an internal combustion engine (not shown here) which, when connected to the connection 210 shown, is coupled to the rotor 111 of the first electric machine 110 for conjoint rotation via the first shaft 130 or—with the interposition of a further coupling—can be coupled thereto.

The illustrated drive arrangement 200 is designed in such a way that a first transmission stage 142 is formed between the connection 210 for an internal combustion engine (not shown here) and the first shaft 130, which is connected to the rotor 111 of the first electric machine 110 for conjoint rotation, for the purpose of stepping up the speed of the rotary movement realized by the internal combustion engine or its connection 210 on the first shaft 130.

For this purpose, an output element 220 of the internal combustion engine is provided, which can have a damper unit 221 or a clutch 222 for opening and closing the torque transmission path between the internal combustion engine and the drive unit 100, or a combination shown of a damper unit 221 and a clutch 222.

Furthermore, the output element 220 comprises an internally toothed gearwheel 223 as a component, which meshes with an external toothing 131 of the first shaft 130 and thus realizes a first transmission stage 142.

It can be seen that, in the exemplary embodiment shown here, an axis of rotation of the output element 220 is offset laterally to the axis of rotation 101 of the drive unit 100.

In this way, a rotary movement generated by the internal combustion engine (not shown here) can be directed via the output element 220 and the first transmission stage 142 on the first shaft 130, so that the rotor 111 of the first electric machine 110 located thereon can be set in rotary movement in order to operate as a generator.

When the separating clutch 150 closes, the applied rotary movement can be transmitted from the first shaft 130, possibly amplified by an electric motor drive through the first electric machine 110, to the output shaft 140. Because of the conjointly rotating connection of the rotor 122 of the second electric machine 120 to the output shaft 140, a torque provided by the second electric machine 120 can also be applied to the output shaft 140.

Alternatively, when the separating clutch 150 is opened, only the second electric machine 120 can be operated alone in order to rotate the output shaft 140.

The rotary movement of the output shaft 140 is directed via its external toothing 141 to the first gear 161 of the connected gear 160, wherein the second transmission stage 162 is realized.

From the first gear 161, the torque or the rotary movement is directed to the countershaft 163, from which it is transferred to the differential transmission 170 via the input gearwheel 171.

The torque is transferred from the differential transmission 170 to the wheel drive shafts (not shown here) or, if necessary, a further transmission to step up or down the torque or the speed.

The illustrated drive arrangement 200 can realize a wide variety of driving states, such as operation of the internal combustion engine alone to drive a motor vehicle, or with the addition of the second electric machine and/or the first electric machine, as well as simultaneous generator operation of the first electric machine during operation of the internal combustion engine and/or the second electric machine, as well as operation of the second electric machine alone, or recuperation operation of the first electric machine and/or the second electric machine.

A hydraulic unit 1 and the flow systems 10, 20 connected thereto and their components are substantially shown in FIGS. 2-5.

Figure 2:
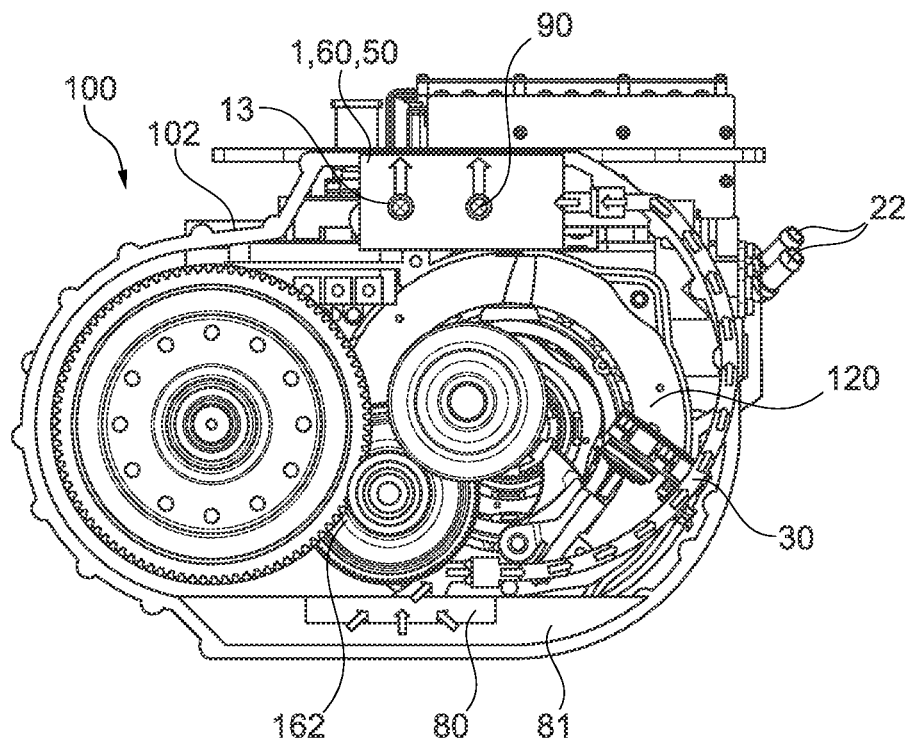
FIG. 2: shows a side view of the drive arrangement.

FIG. 2 shows, in a view from the side, a hydraulic unit 1 as a compact unit in which a volumetric flow source 50 (not shown in detail), in particular a pump, and a hydraulic control unit 60 (also not shown in detail) are arranged. The hydraulic unit 1 is accommodated in a common housing 102, which at the same time is also a housing of the second electric machine 120.

The hydraulic unit 1 comprises a connection for a cooling line 13, with which coolant can be conducted to the unit to be cooled, as well as a connection for an actuation line 90, with which a liquid for actuation of the separating clutch can be conducted.

Furthermore, two cooling water connections 22 can be seen in FIG. 2 for supplying a liquid for the second flow system.

In the lower area, an oil filter 80 can be seen, which is located in an oil sump 81, which represents a storage device for the liquid to be used. An intermediate line 30 leads from this sump 81 to the hydraulic unit 1 in order to supply it with liquid.

The hydraulic unit 1 or the volumetric flow source 50 or pump integrated therein sucks in liquid through the oil filter 80. The volumetric flow source 50 then sets the volumetric flow of the liquid through the hydraulic control unit (not shown here), according to the requirement for cooling an electric machine and/or bearings, gearwheels and the required actuation pressure for activating the separating clutch. By arranging the hydraulic unit in the upper region of the drive arrangement, the installation space within the housing 102 is optimally used.

Figure 3:
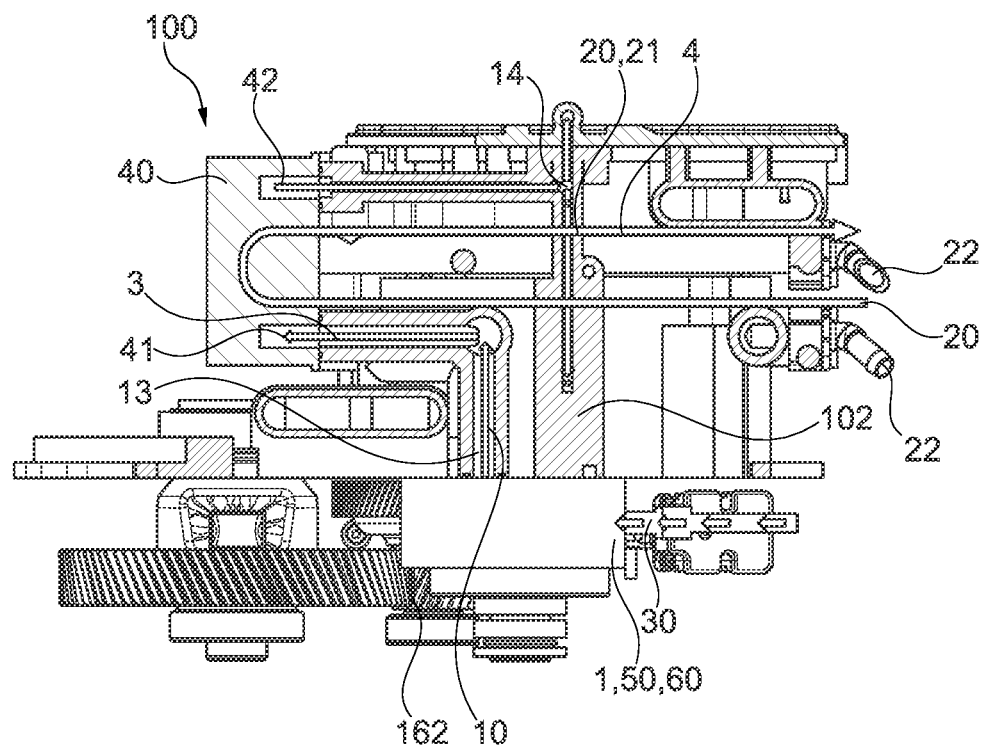
FIG. 3: shows a sectional view of a partial area of the drive arrangement from above.

FIG. 3 also shows a region of the drive arrangement according to a embodiment in a sectional view from above, wherein the second transmission stage 162 is clearly visible here.

The hydraulic system 1 to which the cooling line 13 is connected as part of the first flow system 10 is also shown here. In the embodiment shown here, oil 3 can be transported as a liquid through the cooling line 13.

The volume flow of this liquid reaches a heat exchanger 40 designed as a heat exchanging device, where the liquid flows into an inlet 41 after it has absorbed heat from an electric machine. The liquid flows through the heat exchanger 40 and exits an outlet 42 cooled, since it has transferred heat in the heat exchanger 40 to the liquid, in this case water 4, in the second flow system 20. The second flow system 20 thus serves as a cooling water circuit. The liquid in the second flow system 20 flows in a cooling water line 21. It is provided and fed to the hydraulic system 1 via cooling water connections 22.

As a result of the heat transfer from an electric machine to the liquid, the respective electric machine can be operated in an optimal temperature range and consequently with a relatively high degree of efficiency.

The liquid of the first flow system 10 passes after the outlet 42 to a distribution line 14, which enables the liquid to be distributed in the housing 102.

Figure 4:
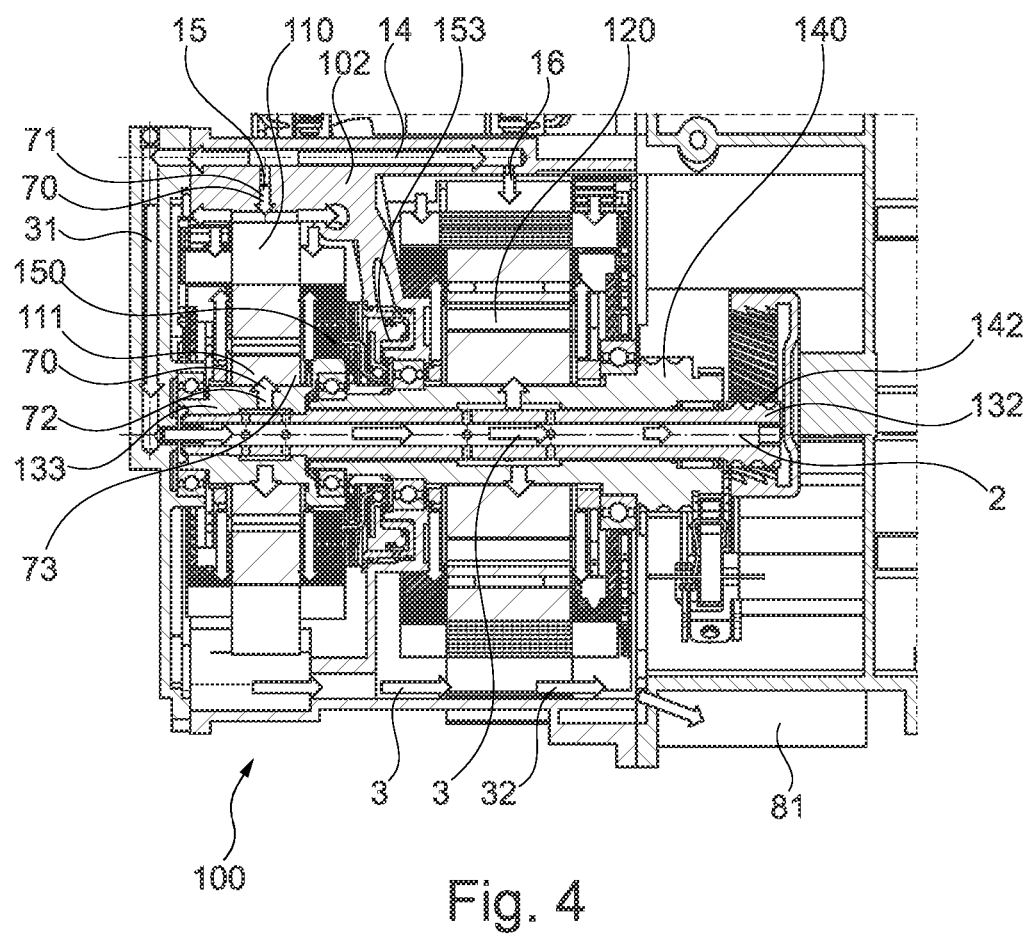
FIG. 4: shows a sectional view of a partial area of the drive arrangement from the side.

FIG. 4 shows flow paths of the cooling medium in a sectional view. The most important units of the drive arrangement on a common axis of rotation 2 are shown here. It can be seen that the flow of the liquid for cooling is divided at several branches 70 in order to be fed to several electric machines 110, 120 and to be able to cool at least the inner side and outer side of the first electric machine 110. This results in a first path 71 for the cooling medium and a second path 72. In particular, via the second path 72, the cooling medium can reach an interior 73 of the first electric machine 110 via the hub 133 on which the rotor 111 of the first electric machine 110 is seated, which is formed by the rotor or also by the stator of the first electric machine 110.

A further branch 70 enables cooling 15 of the stator of the first electric machine 110 to be implemented, and cooling of the state of the second electric machine 120 to be implemented by cooling 16.

To guide the cooling medium from a radial outer side of the two electric machines 110, 120 to the radial inner side, an intermediate line 30 is provided arranged axially on the outside in the embodiment shown here, which forms part of the line system between the oil filter and the hydraulic unit. On the radial inner side, the centrifugal force caused by the rotation ensures that the coolant is distributed.

When the cooling medium has flowed around an electric machine in such a way that it is again on the radial outer side of the electric machine, it can be guided back to the oil sump 81 through a return flow 32.

Figure 5:
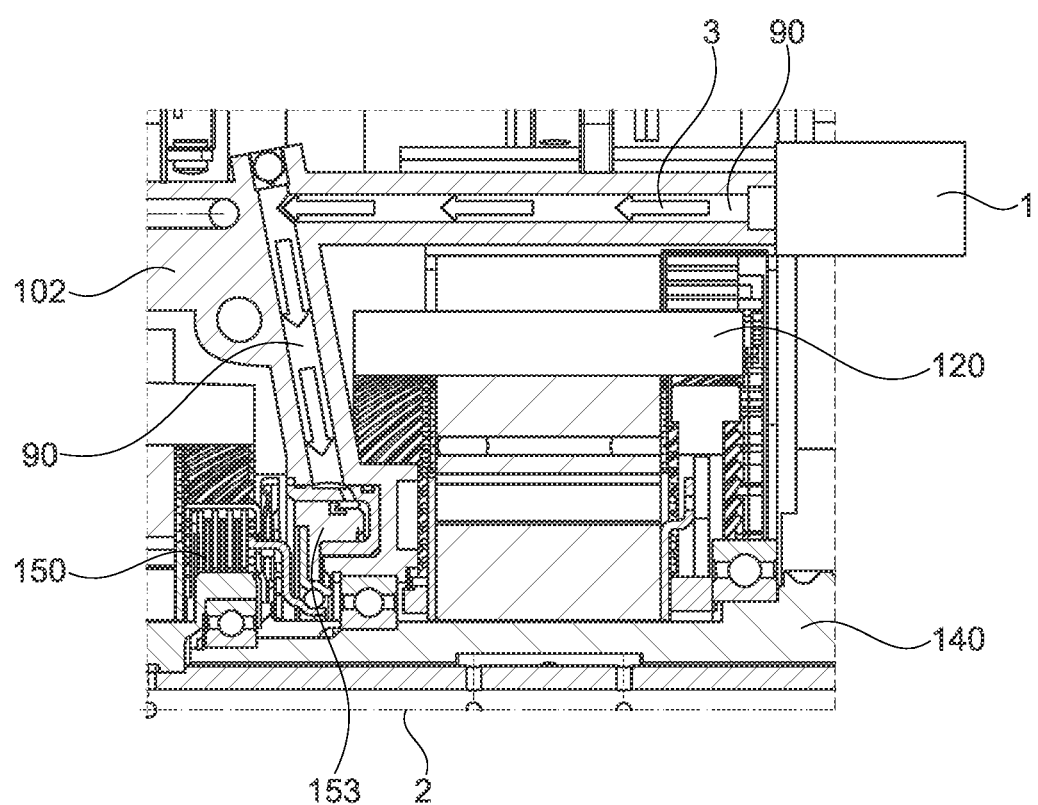
FIG. 5: shows an enlarged view of an area of the sectional view shown in FIG. 4.

In addition to cooling individual units, the hydraulic system can also be configured to actuate the separating clutch 150. The flow system required for this is shown in FIG. 5.

The actuation line 90, which serves to guide oil 3 as a pressure medium, is integrated in the housing 102. This pressure medium is fed to the actuation system 153, which is designed as a hydraulic actuator. When a corresponding pressure is applied, the actuation system 153 causes the separating clutch 150 to close or open.

With the drive unit proposed here and the drive arrangement equipped with same, devices for electrically drivable motor vehicles are provided, the individual components of which can be optimally cooled so that they can be operated with a long service life or with optimal efficiency.

LIST OF REFERENCE SYMBOLS

1 Hydraulic unit
2 Axis of rotation
3 Oil
4 Water
10 First flow system
13 Cooling line
14 Distribution line
15 Cooling of the stator of the first electric machine
16 Cooling of the stator of the second electric machine
20 Second flow system
21 Cooling water line
22 Cooling water connection
30 Intermediate line
31 Outer line
32 Return flow in the oil sump
40 Heat exchanger
41 Inlet for heated liquid
42 Outlet for cooled liquid
50 Volumetric flow source
60 Hydraulic control unit
70 Branch
71 First cooling path
72 Second cooling path
73 Interior
80 Oil filter
81 Oil sump
90 Actuation line
100 Drive unit
101 Axis of rotation
102 Housing
110 First electric machine
111 Rotor of the first electric machine
112 Stator of the first electric machine
120 Second electric machine
121 Rotor of the second electric machine
122 Stator of the second electric machine
130 First shaft
131 External toothing of the first shaft
132 Central hollow shaft
133 Hub
140 Output shaft
141 External toothing of the output shaft
142 First transmission stage
150 Separating clutch
151 Radial inner side of the separating clutch
152 Radial outer side of the separating clutch
153 Actuation system
160 Transmission
161 First gearwheel
162 Second transmission stage
163 Countershaft
164 External toothing of the countershaft
170 Differential transmission
171 Input gearwheel
172 Third transmission stage
200 Drive arrangement
210 Connection for an internal combustion engine
220 Output element
221 Damper unit
222 Clutch
223 Internally toothed gearwheel

The invention claimed is:

1. A drive unit for a drive train of an electrically drivable motor vehicle, the drive unit comprising:
a first electric machine having a rotor;
a second electric machine having a rotor;
an output shaft, the rotor of the second electric machine is connected to the output shaft for conjoint rotation therewith;
a separating clutch by which the rotor of the first electric machine is connectable to the output shaft for torque transmission;
a first flow system for implementing a flow of a first liquid for at least partial cooling of at least one of the first or second electric machines, wherein the first flow system is further configured such that the first liquid is fed through a line to the separating clutch for at least one of cooling or lubrication; and
a second flow system for implementing a flow of a second liquid, wherein the first flow system and the second flow system are configured such that heat from the first liquid in the first flow system is transferrable to the second liquid in the second flow system.

2. The drive unit according to claim 1, further comprising a heat exchanger configured for transferring heat from the first liquid to the second liquid.

3. The drive unit according to claim 1, wherein the line in which the first liquid is fed through is integrated in a housing, the first electric machine and the second electric machine being arranged at least partially within the housing.

4. The drive unit according to claim 1, wherein the first flow system and the separating clutch are configured such that the first liquid is feedable from the first flow system to the separating clutch for hydraulic actuation thereof.

5. The drive unit according to claim 4, further comprising a volumetric flow source, a hydraulic clutch actuator as an actuation system for actuating the separating clutch, and a switching device with which a liquid volumetric flow provided by the volumetric flow source is adapted to be fed sequentially to the electric machines or the clutch actuator.

6. The drive unit according to claim 1, wherein the separating clutch is configured to be electromechanically actuatable.

7. The drive unit according to claim 1, wherein the first flow system has a branch into a first cooling path and into a second cooling path, so that the at least one of the first or second electric machine is adapted to be cooled in a radial interior formed by the rotor thereof and also on a radial outer side thereof.

8. A drive arrangement comprising:
a drive unit according to claim 1; and
an internal combustion engine which is couplable to the rotor of the first electric machine for conjoint rotation therewith.

9. The drive arrangement according to claim 8, further comprising a transmission or an input element of a wheel drive, wherein the internal combustion engine is mechanically connectable via the drive unit to the transmission or the input element of the wheel drive via the separating clutch of the drive unit.

10. The drive arrangement according to claim 9, further, comprising, between the internal combustion engine and a first shaft which is connected to the rotor of the first electric machine for conjoint rotation, a first transmission stage configured for stepping up a speed of a rotary movement realized by the internal combustion engine on the first shaft.

11. A drive unit for a drive train of an electrically drivable motor vehicle, the drive unit comprising:
a first electric machine having a rotor;
a second electric machine having a rotor;
an output shaft, the rotor of the second electric machine is connected to the output shaft for conjoint rotation therewith;
a separating clutch by which the rotor of the first electric machine is connectable to the output shaft for torque transmission;
a first flow system configured to implement a flow of a first liquid for at least partial cooling of at least one of the first or second electric machines, wherein the first flow system is further configured to selectively feed the first liquid to the separating clutch for hydraulic actuation thereof;
a second flow system configured to implement a flow of a second liquid; and
a heat exchanger that transfers heat from the first liquid in the first flow system to the second liquid in the second flow system.

12. The drive unit according to claim 11, wherein the first flow system is further configured such that the first liquid is feedable to the separating clutch for at least one of cooling or lubrication.

13. The drive unit according to claim 11, further comprising a volumetric flow source, a hydraulic clutch actuator as an actuation system for actuating the separating clutch, and a switching device with which a liquid volumetric flow provided by the volumetric flow source is adapted to be fed sequentially to the electric machines or the clutch actuator.

14. The drive unit according to claim 11, wherein the separating clutch is electromechanically actuatable.

15. The drive unit according to claim 11, wherein the first flow system has a branch into a first cooling path that is configured to cool a radial interior of the at least one of the first or second electric machines and into a second cooling path is configured to cool a radial exterior of the at least one of the first or second electric machines.

16. A drive arrangement comprising: a drive unit according to claim 11; and an internal combustion engine which is couplable to the rotor of the first electric machine for conjoint rotation therewith.

17. The drive arrangement according to claim 16, further comprising a transmission or an input element of a wheel drive, wherein the internal combustion engine is mechanically connectable via the drive unit to the transmission or the input element of the wheel drive via the separating clutch of the drive unit.

* * * * *